Nov. 25, 1958 H. THIELE 2,862,066

MEANS FOR RECORDING AND REPRODUCING ACOUSTIC SIGNALS

Filed Aug. 3, 1955 2 Sheets-Sheet 1

INVENTOR.
Heinz Thiele
BY
Singer, Stern & Carlberg
Attorneys

Nov. 25, 1958 H. THIELE 2,862,066

MEANS FOR RECORDING AND REPRODUCING ACOUSTIC SIGNALS

Filed Aug. 3, 1955 2 Sheets-Sheet 2

INVENTOR.
Heinz Thiele
BY
Singer, Stern & Carlberg
Attorneys

United States Patent Office 2,862,066

Patented Nov. 25, 1958

2,862,066

MEANS FOR RECORDING AND REPRODUCING ACOUSTIC SIGNALS

Heinz Thiele, Kiel-Wik, Germany, assignor to Zeiss Ikon A. G., Stuttgart, Germany Application August 3, 1955, Serial No. 526,213

6 Claims. (Cl. 179—100.2)

Figure 1:
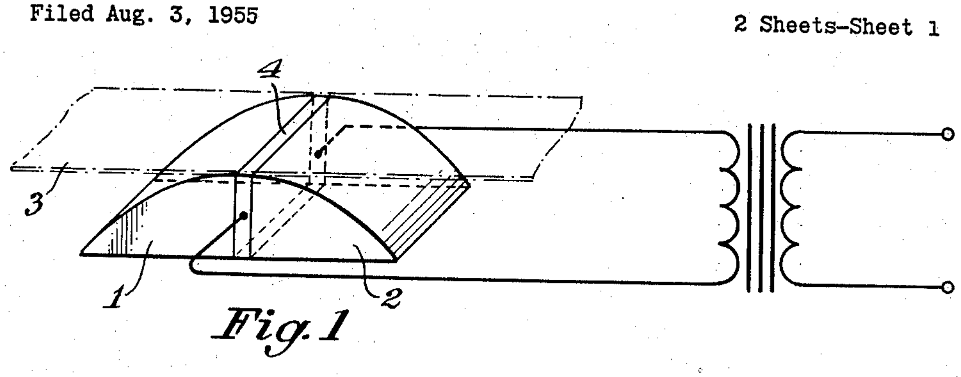
Figure 3:
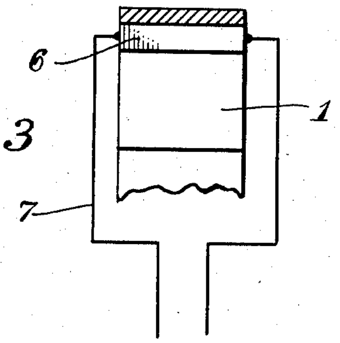

For reproduction of magnetic sound recordings the sound carrier is passed over a ring head consisting of two ferro-magnetic pole shoes the free ends of which form a slot occupied by a non-magnetic foil, or film. The pole legs carry one or more windings in which through the variable magnet field within the pole legs an electromotive force is created that delivers the useful voltage. The slot in the ring head required for recording and reproducing magnetic sound recordings forms in relation to the magnetic field created in the pole shoes a shunt which does not participate in the achievement of the voltage and which becomes the more harmful the narrower the slot width is selected and the larger are the pole shoe surfaces at opposite sides of the plane of the slot. In order to avoid a decrease in the high frequencies to be transmitted it is, however, necessary that the width of the slot be kept as small as possible.

The contradiction in this demand on the recording or reproduction slot is removed if the slot is deprived of its character as a magnetic shunt that does not participate in the creation of the voltage.

According to the present invention, this is accomplished thereby that in the reproduction of magnetic recordings the magnetic fields emanating from the sound carrier are directed past an electrically conductive foil that fills the slot in a magnetic scanning device whereupon the electrical currents created in the foil are supplied to a place of use for acoustic reproduction. Correspondingly, in the sound recording upon a magnetically influenced carrier, the currents produced by a generator, for example a microphone, are supplied to an electrically conductive foil filling the slot in a magnetic recording device whereupon the magnetic fields produced thereby and emanating from the foil are supplied to the recording carrier guided past the same.

Thus, the suggested method fundamentally avoids the creation of a magnetic shunt current which does not participate in the production of the voltage. Therefore, the width of the slot can be designed for the highest frequencies independently of said disturbing shunt phenomena which, in respect of the use of such magnetic heads for long distance viewing, can be of great usefulness.

The conversion effect in the foil utilized in said method can in carrying out the invention find use in addition to the hitherto used methods of magnetic recording and reproduction whereby the disadvantages peculiar to the known methods can be avoided and increase of the reproduction voltage can be achieved.

The device for carrying out this suggested method consists essentially of two ferro-magnetic preferably laminated pole legs between which the foil is disposed in an electrically insulated arrangement and conductively connected with the consumer device or the generator respectively, as for example a reproduction or recording amplifier. The surfaces of the pole shoes adjacent the sound carrier are preferably stationary and convexly curved in relation to the sound carrier.

In order to increase the reproduction voltage, rather than to use a single foil a plurality of foils can be utilized which are electrically insulated against each other and connected in series.

Since the circulating currents produced in the interior of the foil by the magnetic lines of force traversing the same substantially compensate each other, said part of the foil surface does essentially not participate in the conversion process. Therefore, it is advantageous to shape the foil as a frame adapted to the cross-section of the pole shoes. Tests have shown that a maximum of the reproduction potential occurs if only a metal strip disposed adjacent the sound carrier and extending only slightly into the slot serves as a foil the wire connections of which form a wire loop that surrounds the useful alternating flux in the pole shoes as thoroughly as possible. Also, when using a plurality of successively arranged foil strips, the intermediary connections are preferably made as such wire loops.

Contrary to the known magnet heads the adaptation of the slot width of which to the high frequencies to be transmitted is limited through the magnetic shunt current produced, it is of advantage in magnet heads according to the invention to select the slot width, that is the thickness of the slot-forming foil, as small as possible and the surfaces of the opposed pole shoes as large as possible in order, on one hand, to reduce the magnetic resistance and, on the other hand, to raise the limit of the maximum frequency to be transmitted as far as possible. It has been found that foil widths smaller than $5\mu$ are particularly advantageous, as are pole shoes larger than 10 $mm.^2$. As material for the slot-forming foils only materials having good electric conductivity can be considered in view of the intended purpose of said foils. In order to make it possible to dispense with a separate insulation layer between the foil and the pole shoes and between the foils themselves, an aluminum alloy with optimum electric conductivity is suggested as foil material, the surfaces of which are eloxated to produce the electrical insulation.

Another way to make it possible to dispense with separate insulation layers between the foils and the pole core consists in the use of pole shoes of ferrite having a high permeability, the low electrical conductivity of the ferrite affording sufficient insulation against the electrically conductive foil.

Instead of placing the foil having the aforementioned qualities between the pole shoes, an electrically conductive material can also be evaporated onto one of the pole surfaces forming the slot to a thickness corresponding to the desired slot width.

It is known to select the foil for magnet heads from electrically conductive materials, such as copper. From such magnet heads the one suggested according to this invention differs through the fact that the conversion effect of these foils which transforms the traversing magnetic field into an electrical field has not been utilized before.

The drawing shows a plurality of embodiments, one in each of the Figs. 1 to 4, inclusive.

Between pole shoes 1, 2 which are laminated and across which a band shaped sound carrier 3 slides, the electrically conductive foil 4 is disposed and has those of its edges which are perpendicular to the sound carrier connected with a reproduction or recording amplifier (not shown) over a transformer.

Figure 2:
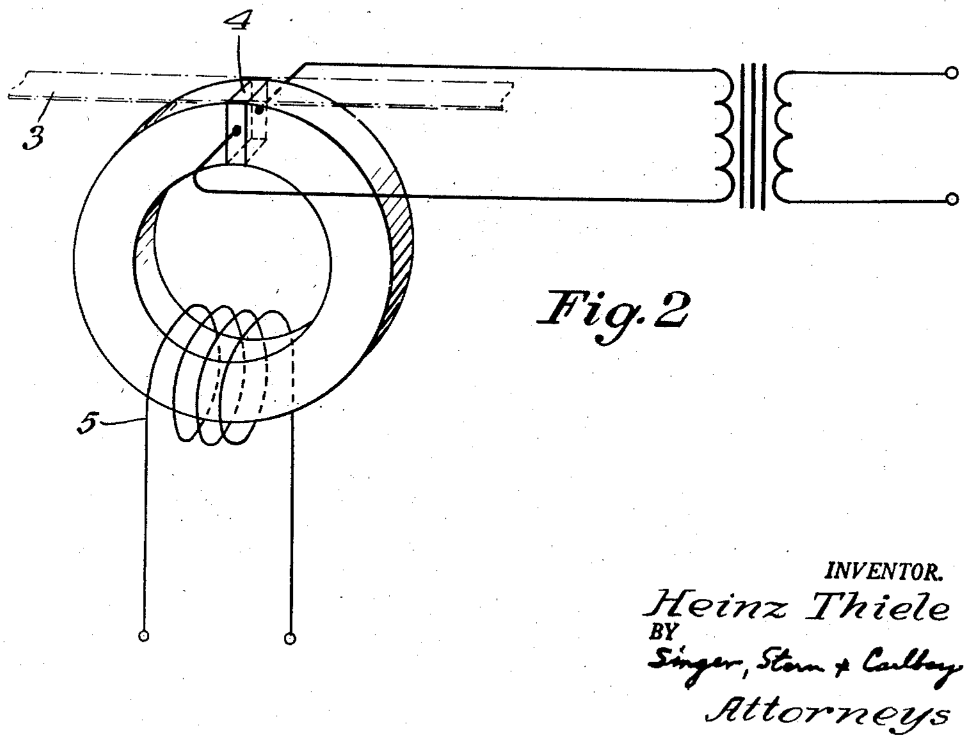

According to Fig. 2 the taking-off of the useful potential produced through the magnetic field of the sound carrier can take place from the foil 4 in addition to the one obtained from the induction winding 5 and the two can be combined with due consideration to any difference of phase that may exist.

Instead of the continuous foil 4, the use of a metal frame is also feasible which covers the edge portions of the cross-section of the pole shoes only. It has been found that it is particularly advantageous to use a metal strip as in Fig. 3 as a slot-forming foil the depth of penetration into the slot of which is small and the ends of which are conductively connected with the user or producer (loud speaker or microphone) through a wire loop 7 which encircles the pole shoes or the useful alternating flux as well as possible, suitable amplifying steps being inserted in said conductive connection, if required.

Figure 4:
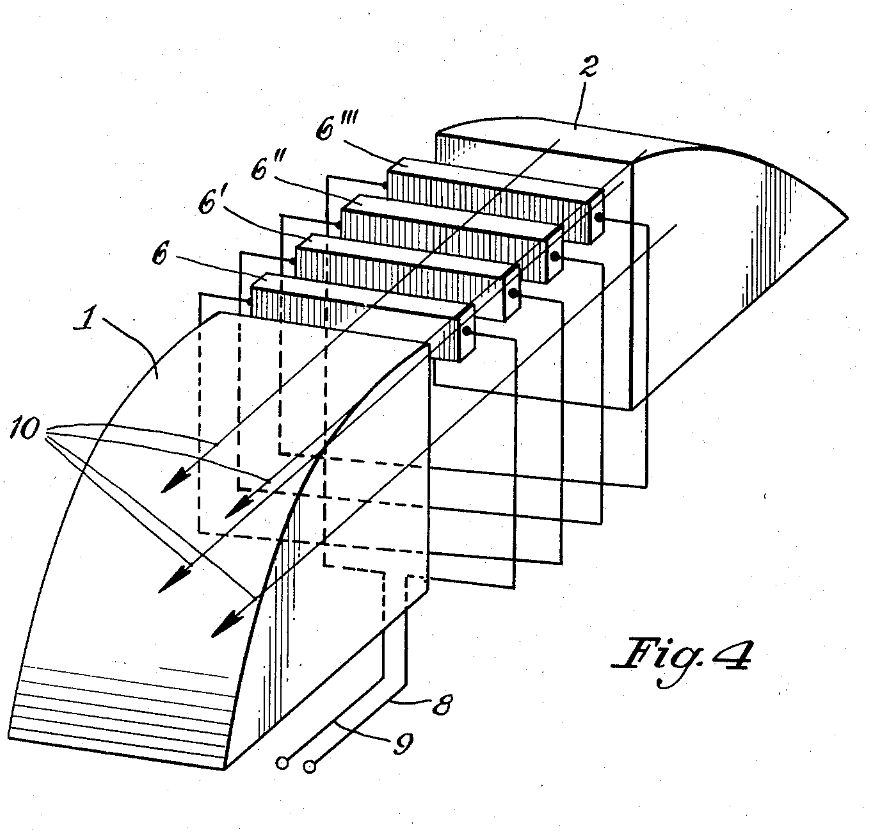

According to Fig. 4, a plurality of such strips 6, 6', 6'', 6''', coupled in series, are employed which in the interest of clarity have been shown spaced from each other. In reality, said strips which only are a few μ in thickness, are insulated from each other and disposed closely together so that the total width amounts to 5 μ as a maximum. The separate strips are, as shown in Fig. 4, coupled in series. Their intermediary connections as well as their supply and take-off connections 8 and 9, as shown in Fig. 4, form loops which in the best possible way surround the useful alternating flux 10 between the pole cores.

What I claim is:

1. In an electromagnetic transducer head including a magnetic circuit having a gap formed by two oppositely disposed pole shoes forming a slot between them over which is passed a magnetic record strip, a plurality of foils in said slot, electrical insulation between said foils, an auxiliary transducer circuit including an amplifier and means interconnecting said foils electrically in series and with said auxiliary transducer circuit.

2. A magnetic transducer head as in claim 1, in which said foils comprise strips extending only part way into the slot, said interconnecting means comprising wire forming a loop which is arranged to encircle the alternating flux in the magnetic circuit between the pole shoes.

3. A magnet head as in claim 1, in which each of said foils comprises an oxidized aluminum alloy of optimum electrical conductivity.

4. A magnet head as in claim 1, in which the pole shoes consist of ferrite of high permeability and low conductivity.

5. A magnet head as in claim 1, in which at least one of said foils comprises an electrically conductive layer deposited on one of said pole shoes by evaporation.

6. A magnet head as in claim 1, in which the width of said slot is less than $10^{-6}$ m. and the area of the adjacent surface of the pole shoes is in excess of ten millimeters square.

References Cited in the file of this patent

UNITED STATES PATENTS

| | | |
|---|---|---|
| 2,479,308 | Camras | Aug. 16, 1949 |
| 2,615,097 | Camras | Oct. 21, 1952 |
| 2,673,896 | Rettinger | Mar. 30, 1954 |